(12) United States Patent
Eom et al.

(10) Patent No.: US 7,835,484 B2
(45) Date of Patent: Nov. 16, 2010

(54) ANTI-FRETTING WEAR SPACER GRID WITH CANOE-SHAPED SPRING

(75) Inventors: Kyong-bo Eom, Daejeon (KR); Kyu-Tae Kim, Daejeon (KR); Jung-min Suh, Daejeon (KR); Shin-ho Lee, Daejeon (KR); Nam-Gyu Park, Daejeon (KR); Joon-kyoo Park, Daejeon (KR); Jin-sun Kim, Daejeon (KR); Il-kyu Kim, Daejeon (KR); Seong-ki Lee, Daejeon (KR); Joon-hyung Choi, Daejeon (KR)

(73) Assignee: Korea Nuclear Fuel Co., Ltd, Republic of Daejeon (KR)

( * ) Notice: Subject to any disclaimer, the term of this patent is extended or adjusted under 35 U.S.C. 154(b) by 337 days.

(21) Appl. No.: 11/971,306

(22) Filed: Jan. 9, 2008

(65) Prior Publication Data
US 2010/0098208 A1    Apr. 22, 2010

(30) Foreign Application Priority Data
Aug. 27, 2007    (KR)    ............ 10-2007-0086024

(51) Int. Cl.
*G21C 3/34*    (2006.01)
(52) U.S. Cl. .................. 376/442; 376/438
(58) Field of Classification Search .......... 376/438–444
See application file for complete search history.

(56) References Cited

U.S. PATENT DOCUMENTS

| | | | | | |
|---|---|---|---|---|---|
| 1,923,669 | A | * | 8/1933 | Harrison | 378/170 |
| 4,396,573 | A | * | 8/1983 | Feutrel | 376/442 |
| 4,411,862 | A | * | 10/1983 | Leclercq et al. | 376/442 |
| 4,885,127 | A | * | 12/1989 | Yokoyama | 376/462 |
| 4,895,698 | A | * | 1/1990 | DeMario | 376/442 |
| 5,307,392 | A | * | 4/1994 | Bryan | 376/442 |
| 5,444,748 | A | * | 8/1995 | Beuchel et al. | 376/438 |
| 6,167,105 | A | * | 12/2000 | Yoon et al. | 376/441 |
| 6,542,567 | B1 | * | 4/2003 | Mayet et al. | 376/442 |
| 6,807,246 | B1 | * | 10/2004 | Kim et al. | 376/438 |

OTHER PUBLICATIONS

"so as to", Answers.com, http://www.answers.com/topic/so-as-to. accessed on Feb. 2, 2010.*

* cited by examiner

*Primary Examiner*—Rick Palabrica
(74) *Attorney, Agent, or Firm*—Sughrue Mion, PLLC (57) ABSTRACT

The present invention relates to an anti-fretting wear spacer grid having a plurality of canoe-shaped springs formed thereon, wherein each of the canoe-shaped springs includes: a fuel rod-contacting part having a flat surface having a predetermined longitudinal length so as to have linear contact with the fuel rod; a curved face-connecting part formed on the upper and lower portions of the fuel rod-contacting part; a leg-connecting part formed on the end portion of the curved face-connecting part; and legs each being formed of a plate shape having a predetermined length and connecting the both sides of the leg-connecting part with one unit grid cell surface.

2 Claims, 12 Drawing Sheets

[Fig 1]

PRIOR ART

ANTI-FRETTING WEAR SPACER GRID WITH CANOE-SHAPED SPRING

This is a non-provisional application under 35 U.S.C. §1.111(a) which claims priority from Korean patent application 10-2007-0086024 filed on Aug. 27, 2007, which is incorporated herein by reference.

BACKGROUND OF THE INVENTION

1. Field of the Invention

The present invention relates to a spacer grid used for placing and supporting a plurality of nuclear fuel rods within a nuclear fuel assembly, and more particularly, to an anti-fretting wear spacer grid with canoe-shaped springs capable of preventing the fretting wear of fuel rods, thereby avoiding the damage of the fuel rods.

2. Background of the Related Art

A nuclear reactor is a device that artificially controls the chain reaction of the nuclear fission of fissile materials, thereby achieving a variety of use purposes such as the generation of heat, the production of radioisotopes and plutonium, the formation of radiation fields, or the like.

Generally, enriched uranium that is obtained by raising a ratio of uranium-235 to a range between 2% and 5% is used in a light water nuclear reactor. The uranium is molded to a cylindrical pellet having a weight of 5 g and is processed to a nuclear fuel used in the nuclear reactor. Numerous pellets are piled up to form hundreds of pellet bundles and then put into a cladding tube made of Zircaloy being at a vacuum state. After that, a spring and a helium gas are put thereinto, and an upper end plug is welded thereon, thereby making a fuel rod. The fuel rod is finally surrounded by a nuclear fuel assembly and then burnt up within the nuclear reactor through nuclear reaction.

Figure 1:
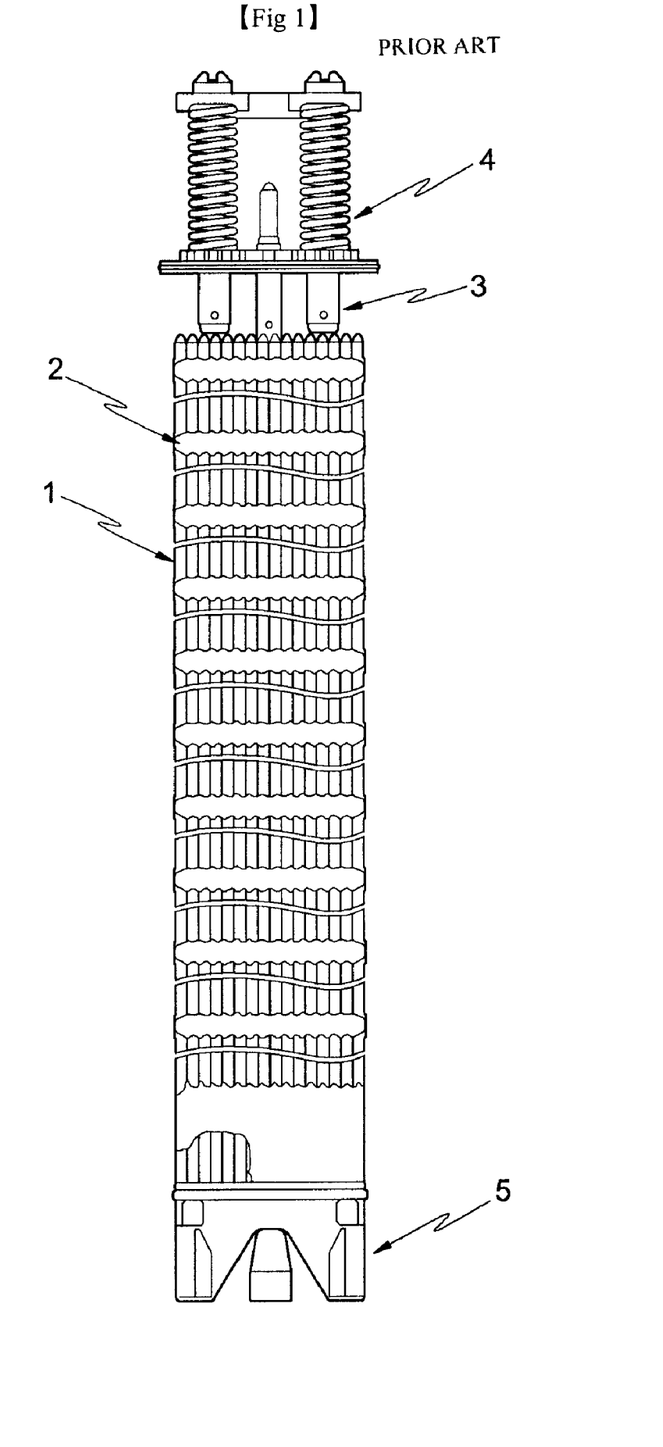
FIG. 1 is a schematic view showing a structure of a general nuclear fuel assembly.
Figure 2:
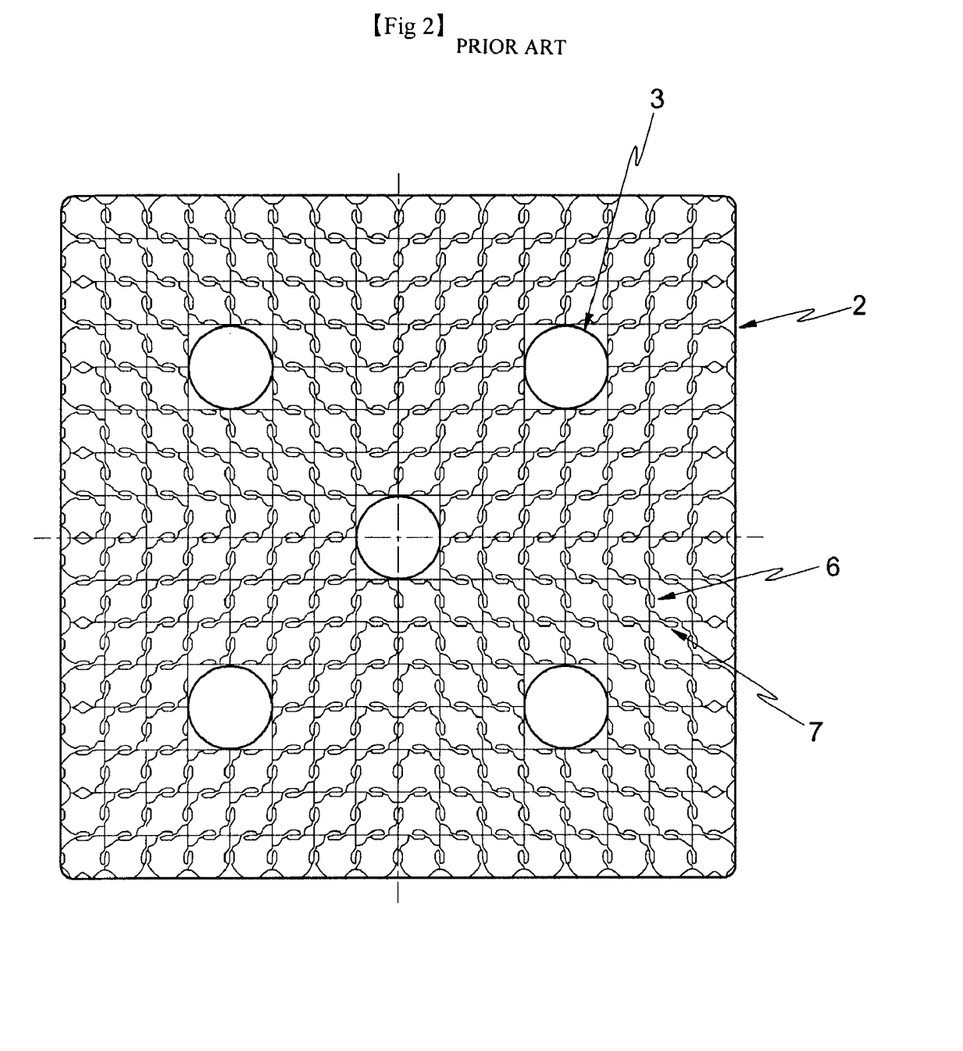
FIG. 2 is a plane view showing a general spacer grid used for a nuclear fuel assembly.

The nuclear fuel assembly and the parts therein are shown in FIGS. 1 and 2. FIG. 1 is a schematic view showing a general nuclear fuel assembly, FIG. 2 is a top plane view showing the spacer grid, and FIG. 3 is a cut-off perspective view showing the spacer grid.

Referring to FIG. 1, the nuclear fuel assembly basically includes a frame body comprised of a top nozzle 4, a bottom nozzle 5, guide thimbles 3, and a plurality of spacer grids 2, and a plurality of fuel rods 1 held longitudinally in an organized array by the spacer grids 2 spaced along the length thereof in such a manner as to be supported by means of springs 6 (see FIGS. 2 and 3) and dimples 7 (see FIGS. 2 and 3) disposed within the spacer grids 2. So as to prevent the formation of the scratches on the fuel rods 1 and the generation of the damage on the springs within the spacer grids 2 upon assembling the nuclear fuel assembly, thereafter, the fuel rods 1 have a locker applied thereon and are then inserted longitudinally into the frame body of the nuclear fuel assembly. Next, the top and bottom nozzles are secured to the opposite ends of the nuclear fuel assembly, thereby finishing the assembling procedure of the nuclear fuel assembly. Then, after the locker of the finished assembly is removed, the distances between the fuel rods 1, the distances between the fuel rods 1, the distortion of the nuclear fuel assembly, the total length thereof, and the dimension thereof are checked out, thereby finishing the manufacturing procedure of the nuclear fuel assembly.

Figure 3:
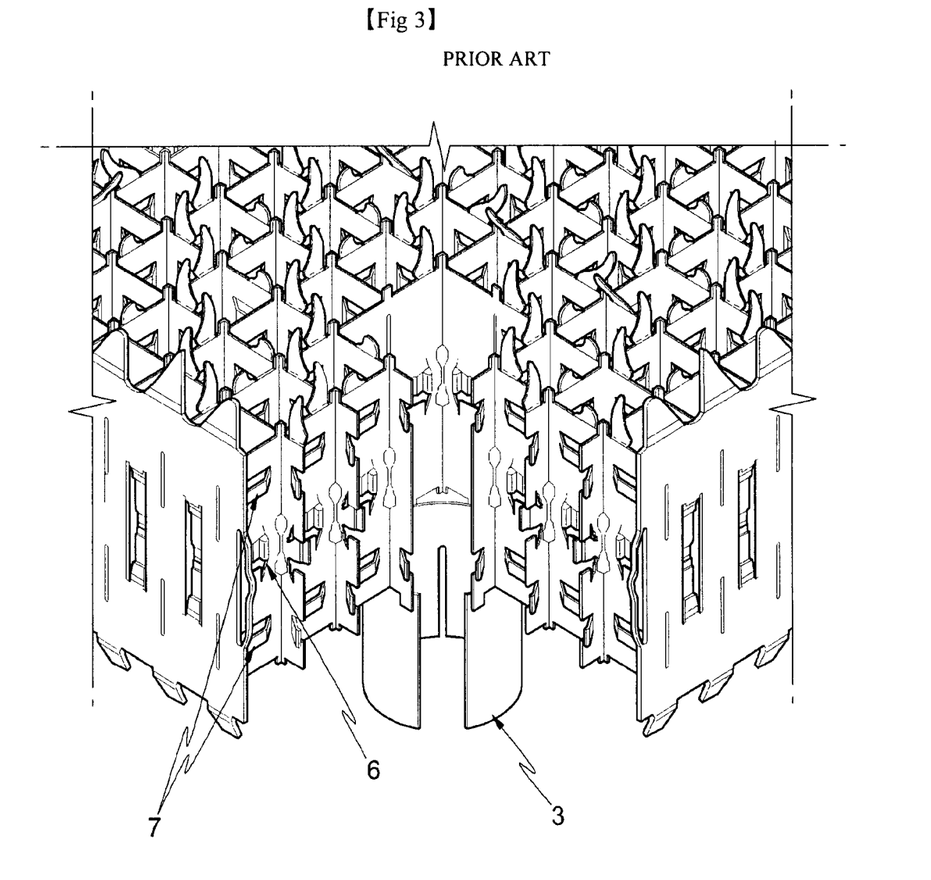
FIG. 3 is a cut-off perspective view showing the general spacer grid used for a nuclear fuel assembly.

Referring to FIGS. 2 and 3, the spacer grid is made in a lattice by coupling a plurality of slots (not shown) formed by a plurality of strips (thin metal plate) connected with one another so as to define a plurality of space portions into which the fuel rods 1 are held longitudinally thereby. About 10 to 13 spacer grids are arranged along the length direction of the nuclear fuel assembly and welded to the guide thimbles 3 having a length of 4 m. The springs 6 and the dimples 7 are regularly formed on each space portion defined by the spacer grid 2, such that as they are brought into contact with the fuel rod 1 (see FIG. 1), the distance between the fuel rods 1 is maintained and arranged at their defined position. Further, the fuel rods 1 are fixed by the elasticity of the springs 6.

On the other hand, the recent development of the nuclear fuel is aimed to obtain high burn-up performance and integrity. So as to develop high burn-up fuel, there are a variety of methods of enhancing the thermal transmission efficiencies from the fuel rods to coolant. Many of the methods are introduced wherein the improvement in the flow characteristics of coolant around the fuel rods is effectively accomplished by attachment of mixing blades to the spacer grid, a change of the shape of the mixing blades, or an appropriate configuration of coolant flow channels in the spacer grid.

However, the above-mentioned methods of enhancing the thermal transmission efficiencies of nuclear fuel assemblies also generate turbulences in coolant flowing around the fuel rods, and the turbulences of the coolant undesirably cause flow-induced vibration by which the fuel rods are vibrated.

The flow-induced vibration of the fuel rods 1 causes the fuel rods to slide against their contact surfaces at which the fuel rods are brought into contact with the springs and dimples of the spacer grids, such that the contact surfaces are partially abraded to cause fretting wear of fuel rods to occur, which results in the damage on the fuel rods. That is, the above-mentioned methods for improving the thermal performance so as to develop the high burn-up fuel result in the acceleration of the damage of the fuel rods.

As the burn-up is conducted, on the other hand, the irradiation growth of the spacer grid is performed transversely. Also, the fuel rods are repeatedly contracted by the radial creeps in the burn-up process in the reactor, that is, by the high pressure caused by the coolant in the reactor, and extended radially by the expansion of fuel pellets, such that the outer diameters of the fuel rods have irregular directionality, which generates the gap between the springs/dimples of the spacer grid and the fuel rod, thereby causing much fretting wear.

So as to reduce the fretting wear, the contact length between the fuel rod and the springs/dimples is extended longitudinally, and otherwise, the surface-contact therebetween is generated, so that even though the fretting wear occurs, the wear depth is substantially reduced even under the same wear area.

Figure 4A:
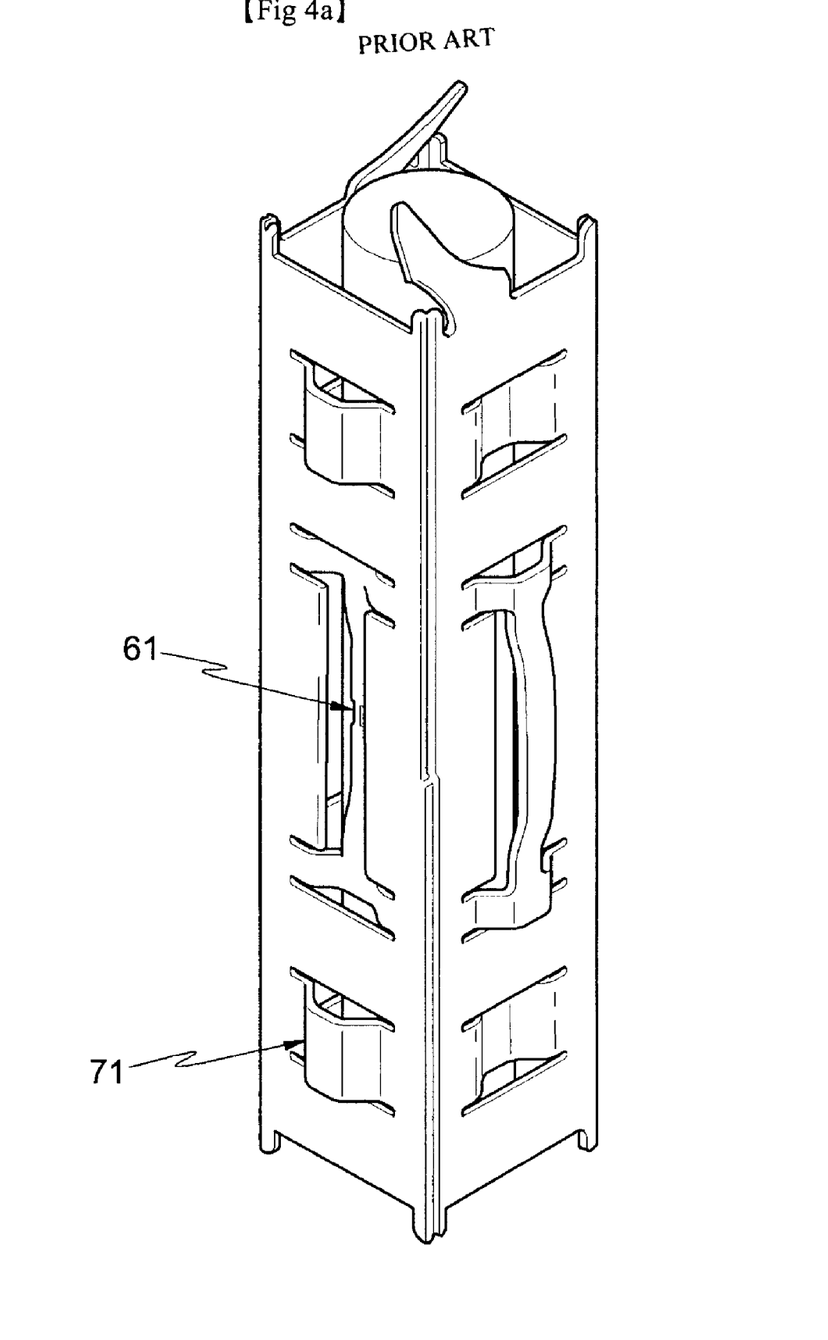
FIG. 4a is a perspective view showing a conventional linear contact type spacer grid cell for a nuclear fuel assembly.
Figure 4B:
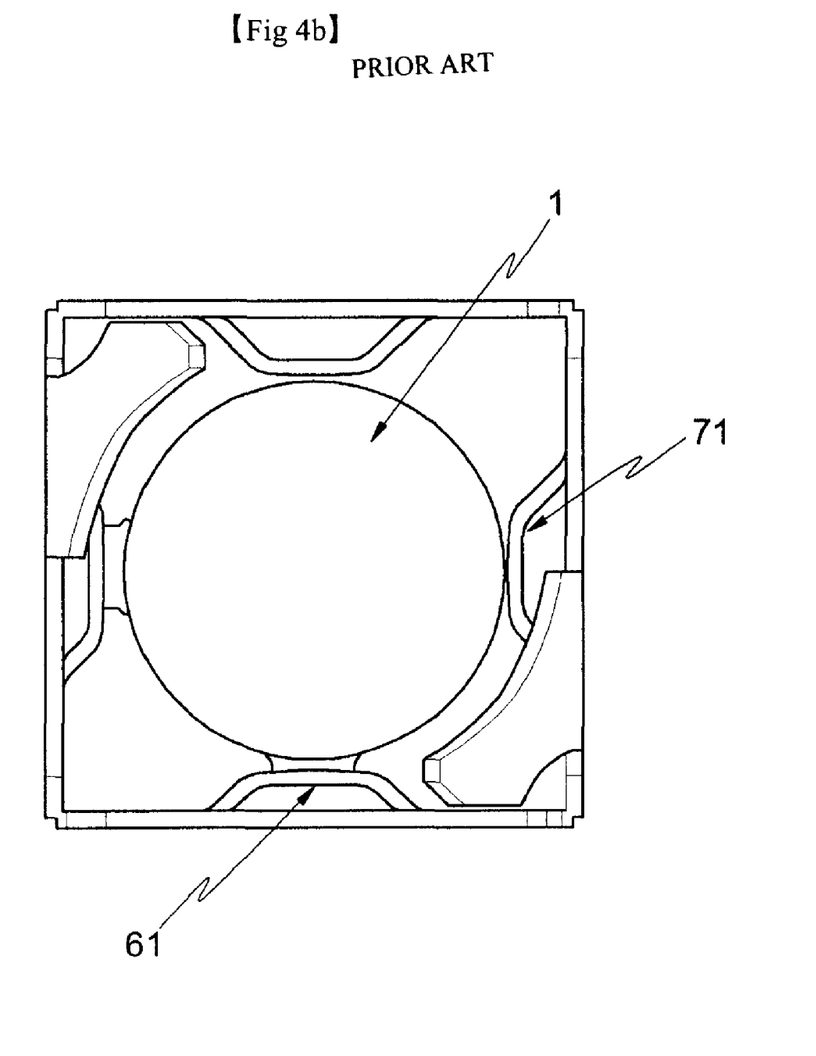
FIG. 4b is a plane view showing the conventional linear contact type spacer grid cell for a nuclear fuel assembly.

FIGS. 4a and 4b show the conventional spacer grid having a spring shape generally used, wherein the linear contact length between the fuel rod and the springs/dimples in the spacer grid is extended longitudinally. The springs protrude horizontally and vertically on a grid surface of the strip and support a nuclear fuel rod.

In the conventional spacer grid, each spring is flat-shaped in a manner of linear contact with the fuel rod, so that the linear contact manner more effectively protects the fuel rod from fretting wear. However, actually, the spring is irregular on the flat surface thereof to obtain an elastic force when supports the fuel rod, as shown in FIG. 4a. Therefore, the initial contact between the fuel rod and the spacer grid are not linear contact, but are three-point contact. As the fretting wear is developed, the three-point contact is changed into the linear contact. At this time, the fretting wear of the fuel rod is accelerated due to the initial three-point contact.

On the other hand, there has been proposed a method for reducing the fretting wear by the generation of the surface contact of the spacer grid with the fuel rod, which is disclosed U.S. Pat. No. 6,606,369 (hereinafter, referred to as 'prior art') entitled 'Nuclear reactor with improved grid, as filed Mar. 6, 2002.

Figure 5A:
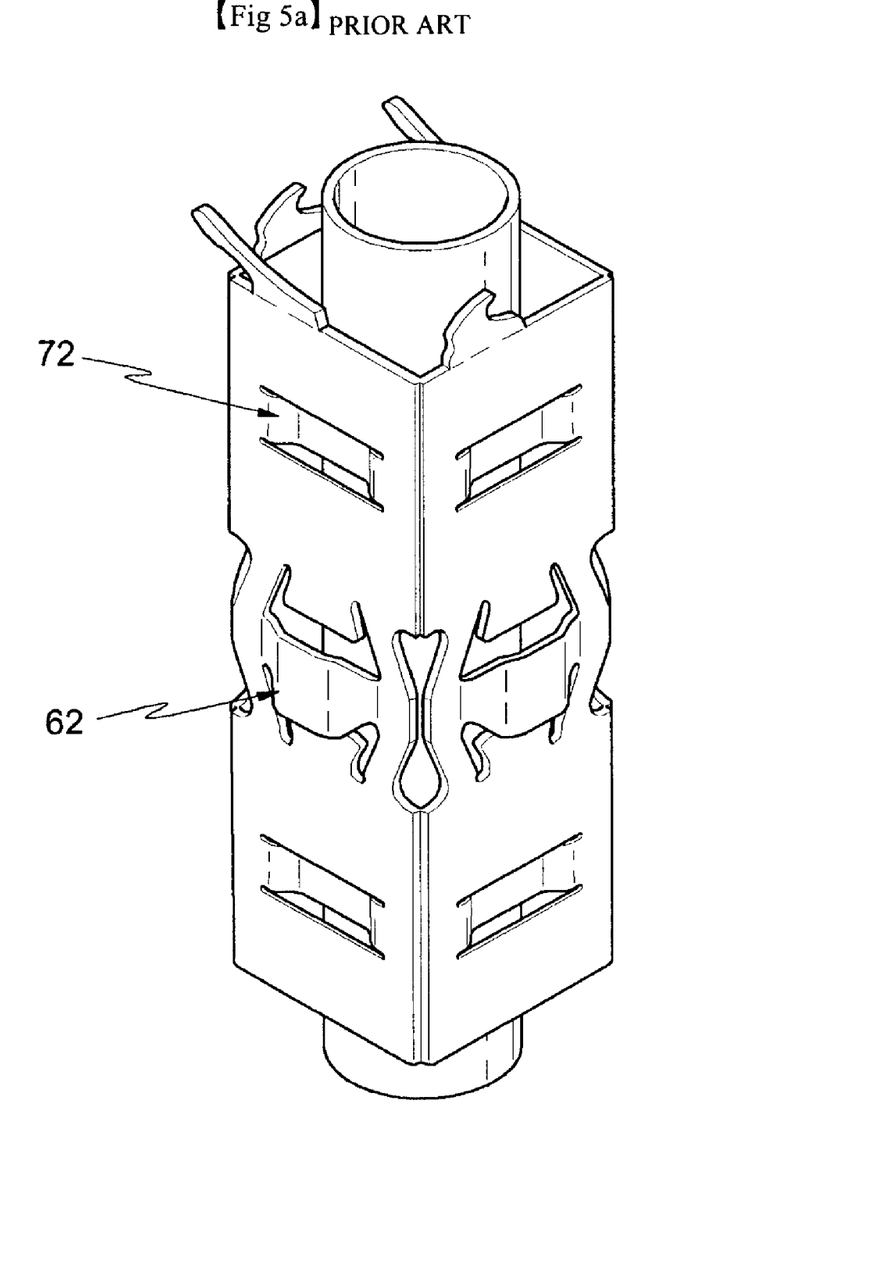
FIG. 5a is a perspective view showing a conventional surface contact type spacer grid cell for a nuclear fuel assembly.
Figure 5B:
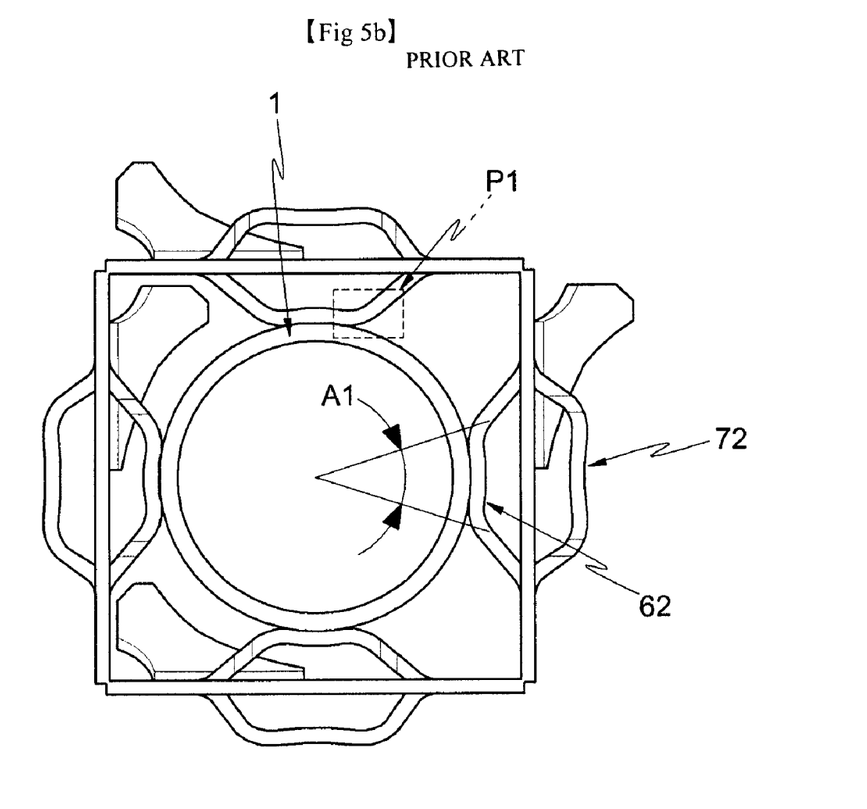
FIG. 5b is a plane view showing the conventional surface contact type spacer grid cell for a nuclear fuel assembly.

According to the prior art, as shown in FIGS. 5a and 5b, a spring 62 has a curved surface in such a manner as to have the surface contact with the fuel rod 1, which more effectively prevents the movements of the fuel rod in axial and transverse directions caused by the flow-induced vibration, in comparison with the conventional point or linear contact manner.

According to the prior art, however, the contact surface of the spring 62 and the dimples 72 with the fuel rod 1 is formed in the same length as the curvature radius of the fuel rod 1, which really makes it impossible to form or maintain the surface contact in an accurate manner by the manufacturing tolerance of the spacer grid and by the variation of the roundness of the fuel rod 1 and also to maintain constant roundness and curvature radius during the burn-up process of the fuel rod.

Further, in case where the contact portion of the spring does not have a theoretically complete curved surface, the irregular linear or point contact of the spring 62 with the fuel rod 1 is formed to cause unexpected fretting wear to happen.

SUMMARY OF THE INVENTION

Accordingly, the present invention has been made in view of the above-mentioned problems occurring in the prior art, and it is an object of the present invention to provide an anti-fretting wear spacer grid with canoe-shaped springs that can provide the linear contact with a fuel rod such that the linear contact is extended as long as possible from initial contact to final contact, thereby achieving greater reduction of the fretting wear depth when compared with the same fretting wear area.

It is another object of the present invention to provide an anti-fretting wear spacer grid with canoe-shaped springs wherein the shape of the contact surface between the canoe-shaped springs and a fuel rod can be constantly maintained through the entire manufacturing procedure of the fuel rod in the nuclear reactor.

To accomplish the above objects, according to the present invention, there is provided an anti-fretting wear spacer grid having a plurality of canoe-shaped springs, the spacer grid including: a plurality of strips adapted to define a plurality of unit grid cells; a pair of upper and lower dimples formed protrudedly in longitudinal and transverse directions on one surface of each unit grid cell; and each of the canoe-shaped springs formed between the pair of upper and lower dimples on one surface of each unit grid cell in such a manner as to be projected to an opposite direction to the projected direction of the dimples, each of the canoe-shaped springs having a given elastic force so as to support the fuel rod together with the dimples, wherein each of the canoe-shaped springs includes: a fuel rod-contacting part having a flat surface having a predetermined longitudinal length so as to have linear contact with the fuel rod; a curved face-connecting part formed on the upper and lower portions of the fuel rod-contacting part; a leg-connecting part formed on the end portion of the curved face-connecting part; and legs each being formed of a plate shape having a predetermined length and connecting the both sides of the leg-connecting part with one surface of each unit grid cell such that the leg-connecting part is projected to a predetermined height from one surface of each unit grid cell, each of the legs being adapted to apply a given elastic force to the canoe-shaped spring.

According to the present invention, therefore, there is provided an anti-fretting wear spacer grid with canoe-shaped springs that can provide the linear contact with a fuel rod such that the linear contact is extended as long as possible from initial contact to final contact, thereby achieving greater reduction of the fretting wear depth when compared with the same fretting wear area.

Additionally, there is provided an anti-fretting wear spacer grid with canoe-shaped springs wherein the shape of the contact surface between the canoe-shaped springs and a fuel rod can be constantly maintained through the entire manufacturing procedure of the fuel rod in the nuclear reactor, thereby diminishing the partial abrasion of the fuel rod due to irregular contact.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, an explanation on an anti-fretting wear spacer grid with canoe-shaped springs according to the present invention will be given with reference to the attached drawings. In the following description, wherever possible, the same reference numerals will be used throughout the drawings and the description to refer to the same or like parts.

On the other hand, the individual space portion defined by the lattice structure of the spacer grid is called a grid cell, and one surface of the interior of the grid cell is called one grid cell surface. Also, if one grid cell surface is disposed in a longitudinal direction, all of the grid cell surfaces located parallel thereto become the grid cell surface being in the longitudinal direction, and the grid cell surfaces located perpendicular to the grid cell surface being in the longitudinal direction becomes those being in the transverse direction. Further, an axial direction is a length direction of the unit grid cell, to which the fuel rod is inserted into the unit grid cell.

Figure 6A:
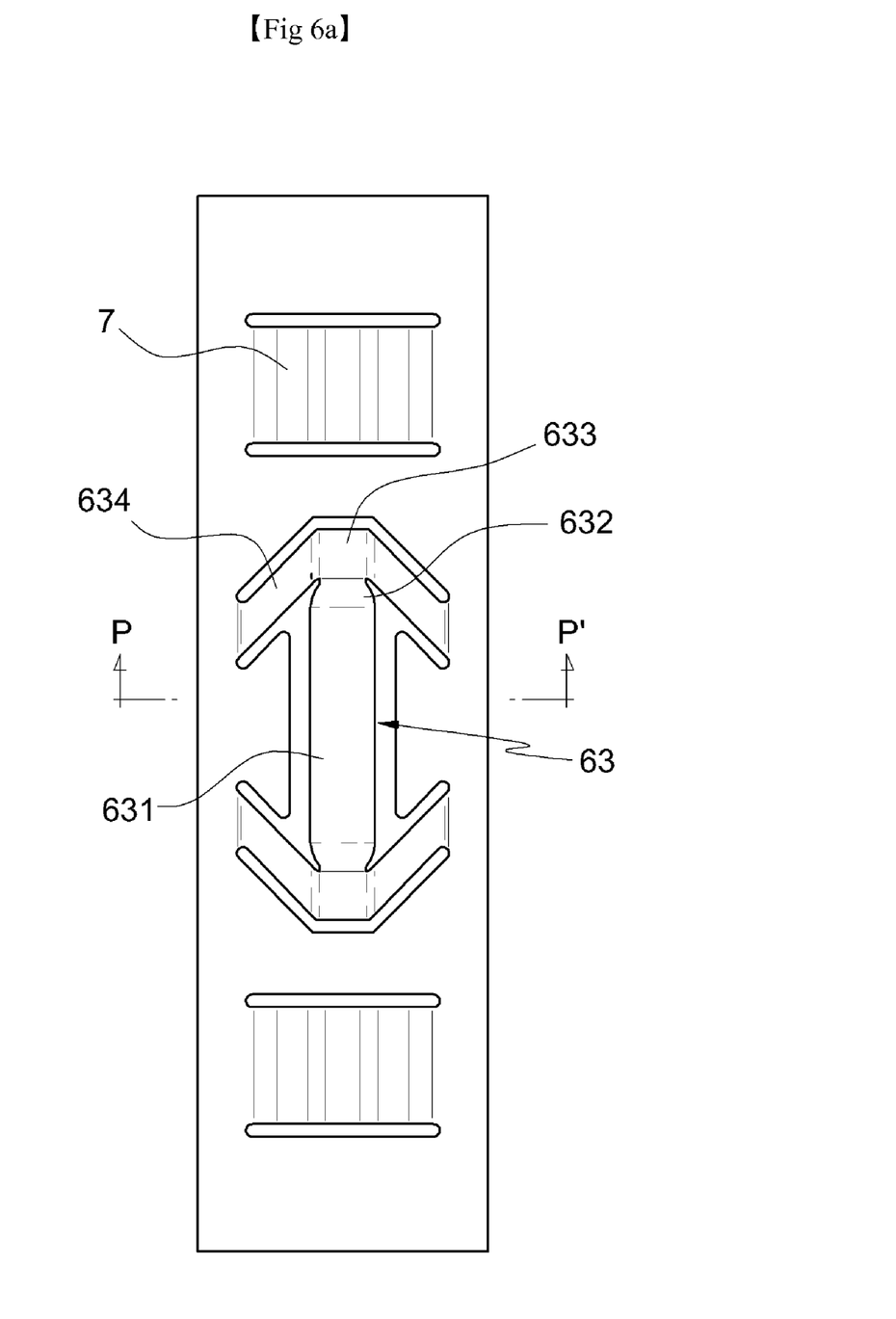
FIG. 6a is a front view showing one unit grid cell surface having a canoe-shaped spring of the spacer grid according to the present invention.
Figure 6B:
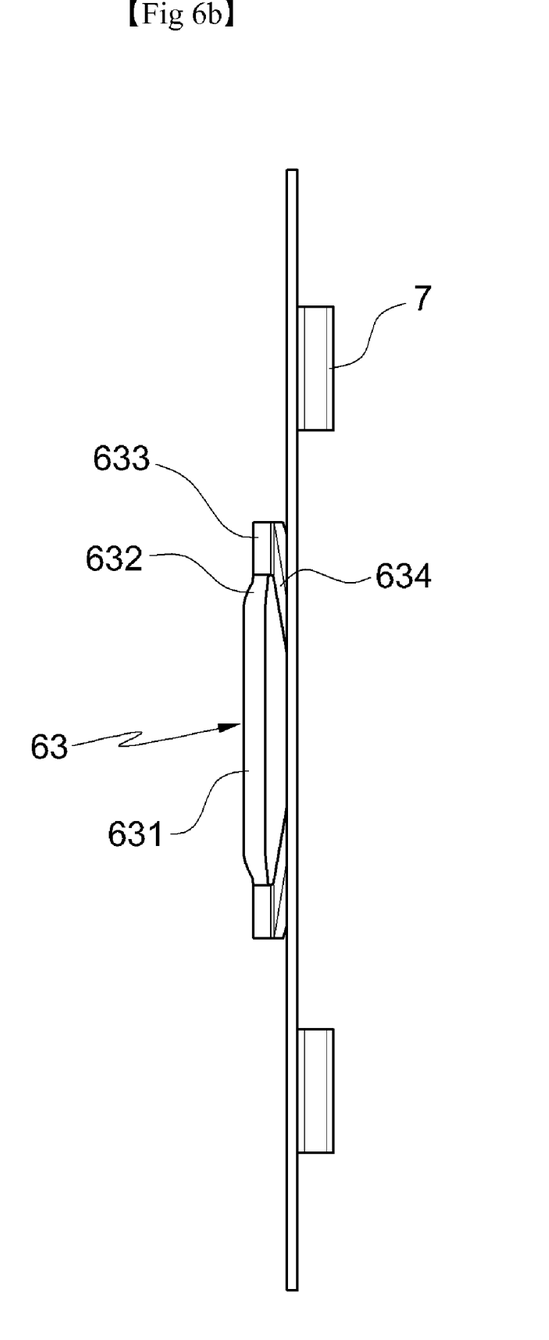
FIG. 6b is a side view showing one unit grid cell surface having a canoe-shaped spring of the spacer grid according to the present invention.
Figure 6C:
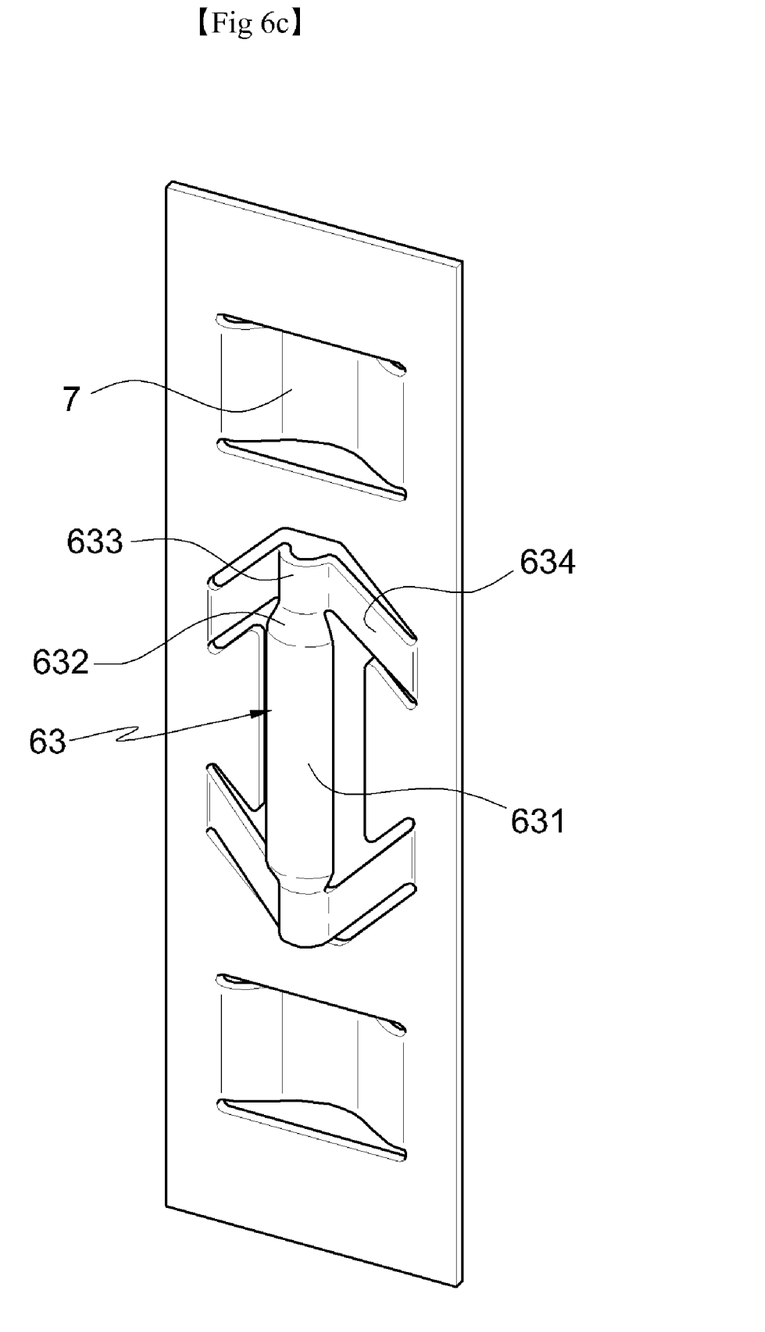
FIG. 6c is a perspective view showing one unit grid cell surface having a canoe-shaped spring of the spacer grid according to the present invention.
Figure 6D:
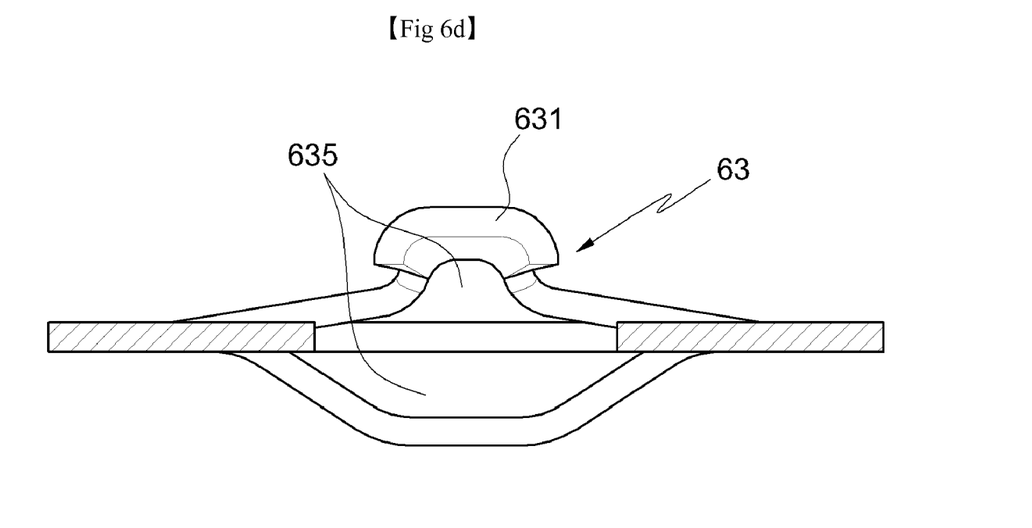
FIG. 6d is a sectional view showing one unit grid cell surface having a canoe-shaped spring of the spacer grid according to the present invention.
Figure 6E:
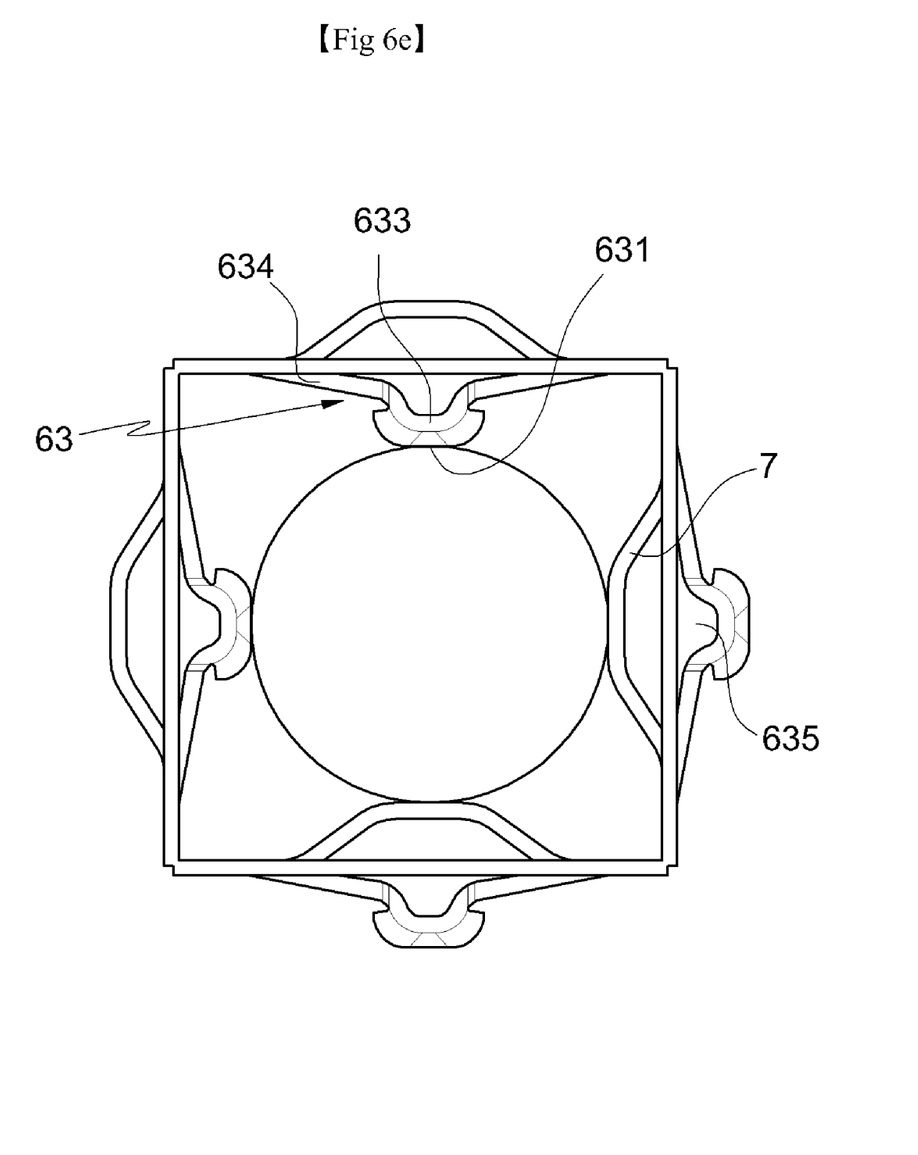
FIG. 6e is a plane view showing the unit grid cell having a canoe-shaped spring of the spacer grid according to the present invention.

As shown in FIGS. 6a and 6e, the canoe-shaped spring 63 disposed on every grid cell surface of the spacer grid is a principal part in the preferred embodiment of the present invention. FIG. 6a is a front view showing one unit grid cell surface having the canoe-shaped spring 63 formed thereon, FIG. 6b shows the side surface of one unit grid cell surface, FIG. 6c is a perspective view showing one unit grid cell surface so as to make the canoe-shaped spring 63 well understood, FIG. 6d is a sectional view showing the portion P-P' of one unit grid cell surface, and FIG. 6e is a top plane view showing the unit grid cell having the canoe-shaped springs formed thereon, into which the fuel rod is imaginarily put.

As shown in FIG. 6a, the canoe-shaped spring 63 basically includes a fuel rod-contacting part 631, a curved surface-connecting part 632, a leg-connecting part 633, and legs 634.

Referring to FIGS. 6a and 6d, first, an explanation of the fuel rod-contacting part 631 will be given.

The fuel rod-contacting part 631 has a predetermined length in the longitudinal direction thereof, as shown in FIG. 6a, and is flat along the middle portion thereof so as to have the linear contact with the fuel rod and is bent toward the spacer grid at the both side portions thereof so as to support the flat middle portion of the fuel rod-contacting part 63, as shown in FIG. 6d, thereby preventing the fuel rod-contacting part 631 from being bent upon the insertion of the fuel rod and during the activation of the nuclear reactor.

Referring to FIGS. 6a and 6b, next, an explanation of the curved surface-connecting part 632 will be given.

The curved surface-connecting part 632 is located between the fuel rod-contacting part 631 and the leg-connecting part 633 as will be discussed later, on the upper and lower portions of the fuel rod-contacting part 631. The curved surface-connecting part 632 has the same outer diameter and shape as the fuel rod-contacting part 631 at the contact portions with the fuel rod-contacting part 631 and has the same outer diameter and contour as the leg-connecting part 633 at the contact portions with the leg-connecting part 633. That is, the curved surface-connecting part 632 has a gradually reduced outer diameter toward the leg-connecting part 633 from the fuel rod-contacting part 631. The curved surface-connecting part 632 serves to connect the fuel rod-contacting part 631 and the leg-connecting part 633 having different outer diameters and contours from each other. The connected portions of the curved surface-connecting part 632 with the fuel rod-contacting part 631 and the leg-connecting part 633 are desirably formed of a gentle curved surface, which prevents the fuel rod from being damaged upon the insertion of the fuel rod into the grid cell.

Referring to FIGS. 6a and 6c, the leg-connecting part 633 will be discussed below.

The leg-connecting part 633 is located at each end portion of the curved surface-connecting parts 632. The leg-connecting part 633 serves to connect the legs 634 as will be discussed later therewith and has a semi-cylindrical shape being hollow at the center thereof. In case where the leg-connecting part 633 is connected to the legs 634, as shown in FIG. 6b, it projects to a predetermined height from one grid cell surface. On the other hand, the leg-connecting part 633 desirably has a smaller outer diameter than that of the fuel rod-contacting part 631 so as to sufficiently form a space portion into which the legs 634 are disposed.

Referring to FIGS. 6a and 6c, an explanation of the legs 634 will be given.

Each of the legs 634 is of a flat shape having a predetermined length. The legs 634 are connected to the grid cell surface from the both sides of the leg-connecting part 633. At this time, the conventional legs are generally formed perpendicular to the direction of the insertion of the fuel rod, that is, to the axial direction, but the legs 634 of the present invention are desirably formed oblique with respect to the axial direction so as to permit the stiffness of the spring to be sufficiently lowered.

On the other hand, the dimples 7 have the same structure as well known in the art, and therefore, an explanation on them will be avoided for the brevity of the description.

Hereinafter, an explanation on the operations of the anti-fretting wear spacer grid with the canoe-shaped springs according to the present invention will be given.

In case where the fuel rod (not shown) is inserted longitudinally into the unit grid cell on which the springs 63 are formed, as shown in FIG. 6e, the fuel rod is brought into contact with the fuel rod-contacting part 631. At this time, the bending portions of the fuel rod-contacting part 631 formed at the both side portions thereof function to maintain the linear contact shape between the fuel rod and the fuel rod-contacting part 631 during the entire life time of the nuclear fuel assembly, thereby enhancing the stiffness of the fuel rod-contacting part 631 and preventing the shape of the fuel rod-contacting part from being distorted.

At this time, the legs 634 function to support the fuel rod-contacting part 631 and to provide a given elastic force between one unit grid cell surface and the fuel rod-contacting part 631. In this case, the longer the legs 634 are, the lower the stiffness of the spring 63 becomes. In the preferred embodiment of the present invention, the leg-connecting part 633 has a relatively small outer diameter, thereby ensuring the space portion into which the legs 634 are disposed, and further, the legs 634 are formed oblique with respect to the axial direction, thereby permitting the legs 634 to be extended longer. That is, in the preferred embodiment of the present invention, the leg-connecting part 633 having the smaller outer diameter and the obliquely formed legs 634 provide good flexibility to the spring 63.

The two canoe-shaped springs 63 and the four dimples 7 are formed within each unit grid cell of the spacer grid, so that the linear contacts with the fuel rod are formed on the total six contact portions thereof, thereby restricting the movement of the fuel rod.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A nuclear fuel assembly comprising a plurality of fuel rods and a spacer grid having canoe-shaped springs for preventing fretting wear of the fuel rods, the spacer grid comprising:

strips adapted to define a plurality of unit grid cells; and a plurality of springs each protruding in predetermined directions on a grid surface of a strip of the strips and supporting a nuclear fuel rod of the plurality of fuel rods with predetermined elasticity, wherein each spring of the plurality of springs comprising:

a fuel rod-contacting part having a flat surface and two reinforcing portions, the flat surface comprising an upper end, a lower end, and two sides, wherein the flat surface has a predetermined length along a longitudinal direction of the fuel rod-contacting part from the upper end to the lower end, and a predetermined width in a direction transverse to the longitudinal direction from one of the two sides to the other of the two sides, wherein the flat surface is in linear contact with the nuclear fuel rod and wherein the two reinforcing portions are respectively located at the two sides of the flat surface so as to prevent the flat surface from getting distorted and are separated from the grid surface;

legs installed between the fuel rod-contacting part and the grid surface, giving elastic force to the spring and supporting the spring on the grid surface, wherein each one of the two reinforcing portions is formed along the longitudinal direction of the fuel rod-contacting part and is bent toward the grid surface and has a shape of a curved surface extending from one of the two sides of the flat surface;

an upper leg-connecting part and a lower leg-connecting part, wherein each of the upper leg-connecting part and the lower leg-connecting part is formed between two legs of the installed legs and connecting the two legs; and an upper curved surface-connecting part and a lower curved surface-connecting part, wherein the upper curved surface-connecting part is installed between an upper portion of the fuel rod-contacting part and the upper leg-connecting part and is connected to both the upper portion of the fuel rod-contacting part and the upper leg-connecting part, and the lower curved surface-connecting part is installed between a lower portion of the fuel rod-contacting part and the lower leg-connecting part and is connected to both the lower portion of the fuel rod-contacting part and the lower leg-connecting part, and wherein each of the upper curved surface-connecting part and the lower curved surface-connecting part has a gradually reduced width toward a corresponding leg-connecting part of the upper and lower leg-connecting parts from the fuel rod-contacting part, and an outer diameter and shape of the upper curved surface-connecting part are the same as an outer diameter and a shape of the fuel rod-contacting part at a contact portion between the upper curved surface-connecting part and the fuel rod-contacting part, and an outer diameter and a contour of the lower curved surface-connecting part are the same as an outer diameter and a contour of the fuel rod-contacting part at a contact portion between the lower curved surface-connecting part and the fuel rod-contacting part.

2. The nuclear fuel assembly according to claim 1, wherein two legs connected by the upper leg-connecting part are formed to be oblique with respect to the longitudinal direction of the fuel rod-contacting part in opposite directions to each other and two legs connected by the lower leg-connecting part are formed to be oblique with respect to the longitudinal direction of the fuel rod-contacting part in opposite directions to each other.

* * * * *